(12) United States Patent
Zhu et al.

(10) Patent No.: US 12,452,724 B2
(45) Date of Patent: Oct. 21, 2025

(54) SYSTEMS AND METHODS FOR MANAGEMENT OF NETWORK SLICE ACCESS

(71) Applicant: Verizon Patent and Licensing Inc., Basking Ridge, NJ (US)

(72) Inventors: Lily Zhu, Parsippany, NJ (US); Bharadwaj Vemuri, Jersey City, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 415 days.

(21) Appl. No.: 18/067,889

(22) Filed: Dec. 19, 2022

(65) Prior Publication Data
US 2024/0205728 A1    Jun. 20, 2024

(51) Int. Cl.
*H04W 28/02*    (2009.01)
*H04W 8/18*    (2009.01)

(52) U.S. Cl.
CPC ......... *H04W 28/0252* (2013.01); *H04W 8/18* (2013.01)

(58) Field of Classification Search
None
See application file for complete search history.

(56) References Cited

U.S. PATENT DOCUMENTS

| 11,071,055 | B1* | 7/2021 | Wang | H04W 24/02 |
|---|---|---|---|---|
| 2020/0068473 | A1* | 2/2020 | Tang | H04W 36/322 |
| 2021/0204207 | A1* | 7/2021 | Fiorese | H04L 67/146 |
| 2022/0286891 | A1* | 9/2022 | Zhu | H04W 28/0215 |
| 2023/0276352 | A1* | 8/2023 | Wang | H04L 41/0894 455/434 |
| 2024/0297822 | A1* | 9/2024 | Luthra | H04L 41/22 |

* cited by examiner

*Primary Examiner* — Lonnie V Sweet

(57) ABSTRACT

Systems and methods described herein enable dynamic in-app subscriptions and controls for network slices. A user device receives a command to launch an application and identifies a preferred network slice for the application. The application determines that a network services subscription for the user device does not include the preferred network slice and obtains consent, from a user of the user device, to add the preferred network slice to the network services subscription. The user device receives, from a provider network, authorization for using the preferred network slice by the application and initiates a network session on the preferred network slice.

20 Claims, 12 Drawing Sheets

SYSTEMS AND METHODS FOR MANAGEMENT OF NETWORK SLICE ACCESS

BACKGROUND

Next Generation mobile networks, such as Fifth Generation (5G) mobile networks, are being deployed as the next evolution of mobile wireless networks. 5G mobile networks are designed to increase data transfer rates, increase spectral efficiency, improve coverage, improve capacity, and reduce latency. For example, a 5G network may incorporate network slicing technology to increase network efficiency and performance. As another example, a 5G network may provide mobile devices with the ability to use User Equipment (UE) Route Selection Policy (URSP) rules, to enable the mobile devices to access particular services.

DETAILED DESCRIPTION OF EXAMPLE EMBODIMENTS

Figure 1A:
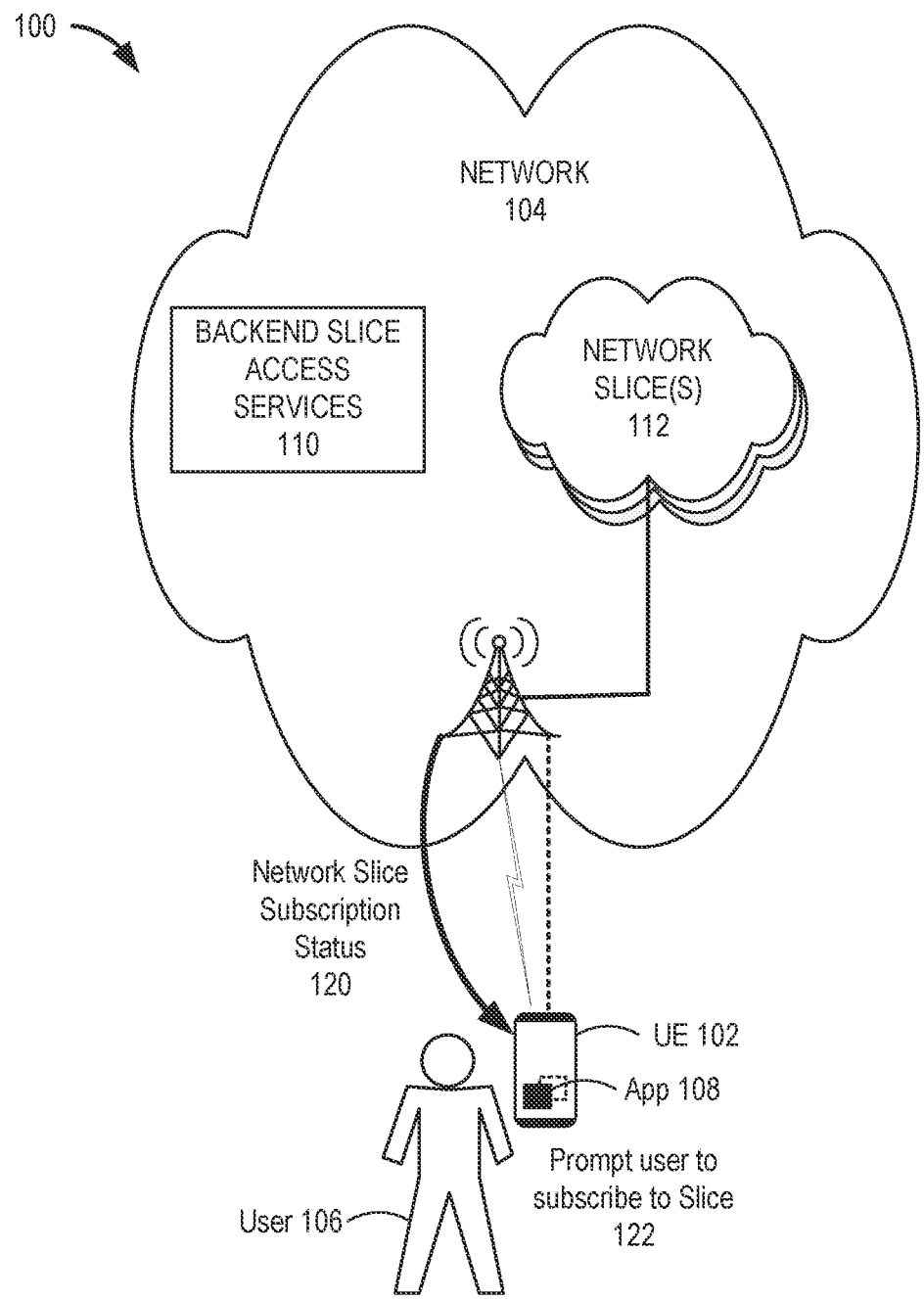
FIGS. 1A-1C illustrate concepts described herein.

The following detailed description refers to the accompanying drawings. The same reference numbers in different drawings may identify the same or similar elements. Also, the following detailed description does not limit the invention.

Systems and methods described herein relate to managing authorized access to network slices. User equipment (UE) devices may execute various applications that generate network traffic with different service requirements. These different service requirements may be met through network slicing. A network slice refers to a complete logical network that includes components, of a Radio Access Network (RAN) and Core Network, which provide certain telecommunication services and network capabilities that can vary from slice to slice. Selection of network slices for a particular application can thus have significant impact on network performance and user experience. Accordingly, network operators need to ensure that network slices are not overloaded and that network slice usage is limited to appropriate applications.

To better manage traffic for different types of applications, UE Route Selection Policies (URSP) have been proposed as a device-side feature in the 5G standalone (SA) architecture. The URSP framework provides traffic steering rules for the UE device and enables the UE device to determine how a certain application should be handled in the context of traffic routing to an appropriate network slice. Currently, an operating system (OS) on the UE devices supports URSP enforcement. However, updated URSP rules may not be accessible when a UE is connected in a 5G non-standalone (NSA) environment. Furthermore, URSP enforcement may require coordination between a mobile network operator (MNO) and OS vendors to support authorized application access to network slices.

MNOs and application developers can benefit from a more streamlined process for providing new network slicing products and providing greater slicing controls to the users (e.g., users of applications on the UE devices). One example where such a streamlined process can be beneficial is in providing dynamic in-app subscriptions and pausing for network slices. Access to premium network slices, such as those providing low latency data transfers and/or high quality of service (QoS), may be offered as an additional feature to existing subscribers. The premium network slices may provide a performance boost (e.g., over default internet traffic service) for gaming applications and/or streaming applications, for example. Thus, MNOs may benefit from providing convenient user access to new network slicing products (e.g., for consumer cloud gaming, etc.) and while still controlling network slice access.

Systems and methods described herein enable MNO-managed network slice access without special OS support, allowing a user to control which application may use what network slices and when. According to an implementation, the systems and methods described herein may leverage an on-device background service (referred to herein as an "MNO utility application") and a backend entitlement system to initiate new network slice subscriptions.

As used herein, the term "user" is intended to be broadly interpreted to include a user device or a user of a user device. Also, the term "user," "consumer," and "subscriber" may be used interchangeably. Furthermore, the term "subscription" is intended to refer to a network services subscription unless otherwise indicated.

Figure 1B:
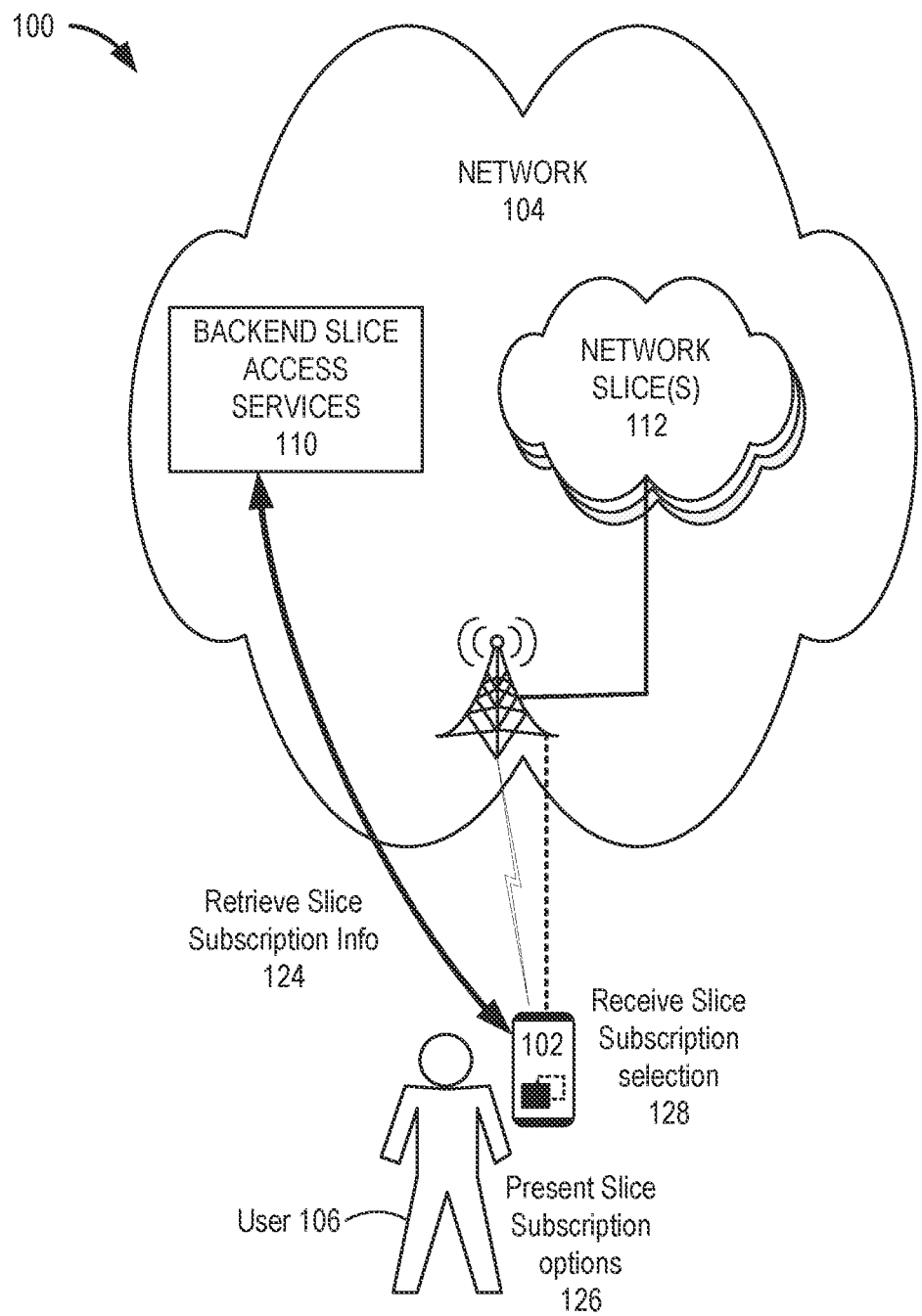
Figure 1C:
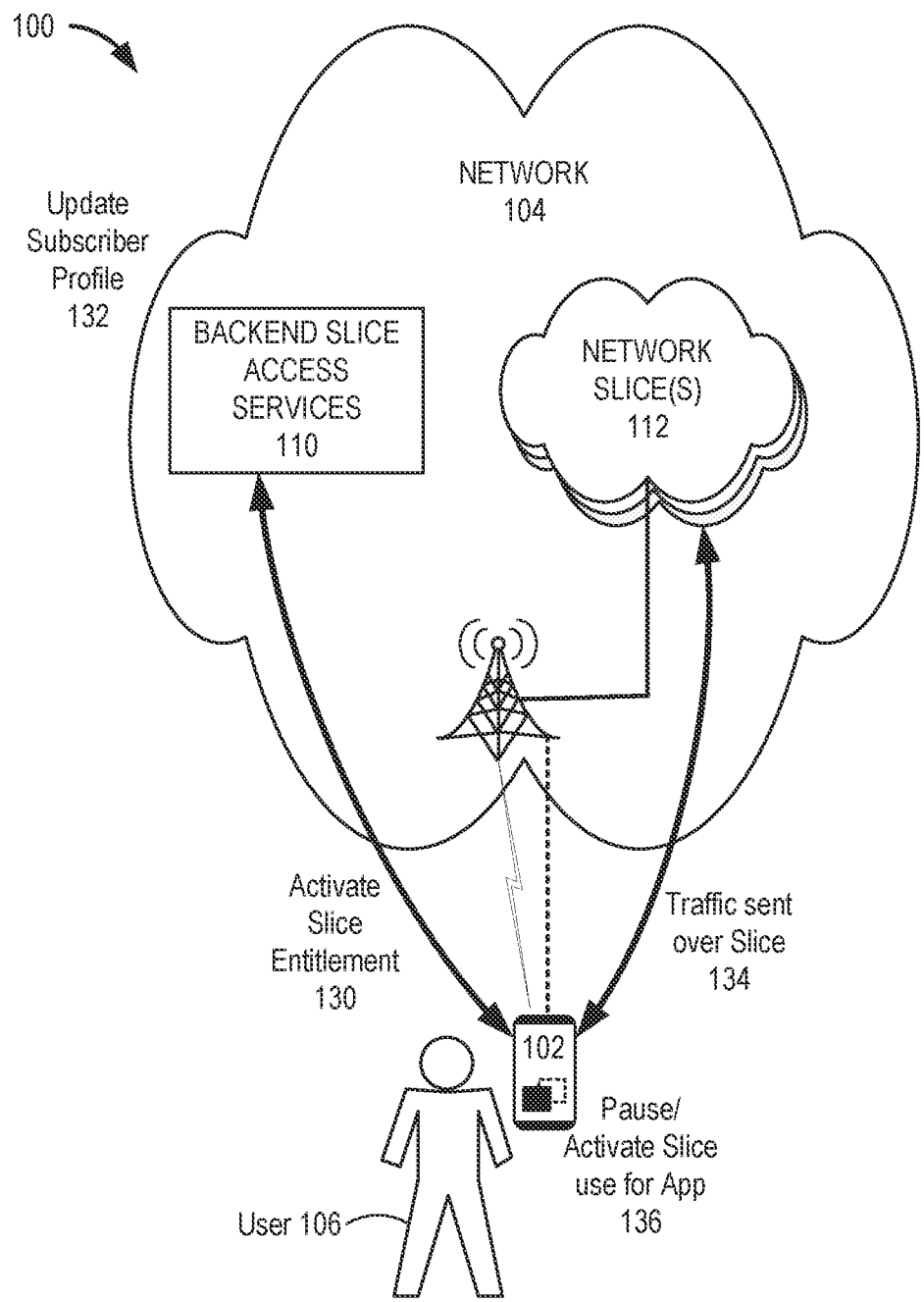

FIGS. 1A-1C illustrate an overview of the concepts described herein. As shown, a network 104 (e.g., a mobile network, also referred to herein as a provider network) is configured to provide communications-related services to a User Equipment device (UE) 102. UE 102 may execute one or more applications (e.g., App 108) that may use network slices 112.

Network slices 112 employ a virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated or shared storage and/or computational resources that include access network components, clouds, transport, Central Processing Unit (CPU) cycles, memory, etc. Furthermore, each network slice 112 may be configured to meet a different set of requirements and be associated with a particular QoS class, a type of service, and/or a particular group of customers associated with mobile communication devices.

According to an implementation, one or more network slices 112 may be configured to provide premium services (e.g., low latency, high QoS, etc.) for which a user subscription is required. For example, for optimal performance, an app 108 (e.g., a real-time gaming app, etc.) on UE 102 may require guaranteed low latency that is not available over standard network connections. If a user/subscriber does not have a subscription to a particular network slice (e.g., a network slice providing premium service), an application (e.g., app 108) cannot use that network slice and may default to a non-premium network slice or default Internet traffic connection, for example.

According to implementations described herein, network 104 can update a user's subscription to provide in-app authorization for a network slice 112 (e.g., a premium network slice). For example, app 108 may be configured for optimal performance using premium network slicing and, when launched, may request to establish a connection with a premium network slice. As shown in FIG. 1A, devices in network 104 may provide network slice subscription status 120 to UE 102. As described further herein, according to different implementations, network slice subscription status 120 may be provided to app 108 using UE Route Selection Policy (URSP) rules, Protocol Configurations Options (PCO) values, and/or communications with an intervening MNO utility application.

Assuming the user does not have a subscription for a network slice requested by app 108, dynamic in-app subscription to network slices may be provided. Thus, as indicated at reference 122, app 108 may prompt a user to subscribe to a network slice. As described further herein, according to different implementations, UE 102 may provide an on-screen prompt via app 108 or via an intervening MNO utility application (not shown in FIGS. 1A-1C).

As shown in FIG. 1B, assuming the user indicates agreement to subscribe to a network slice, app 108 (or the MNO utility application) may retrieve slice subscription information 124. Slice subscription information 124 may include, for example, purchase options and service levels (e.g., time limits, data levels, unlimited, etc.) available for the requested network slice. As indicated at reference 126, app 108 may prompt a user to select a purchase option for the network slice, and as shown at reference 128, UE 102 may receive user input to the subscribe prompt.

As shown in FIG. 1C, assuming the user indicates agreement to purchase a network slice subscription, app 108 (or the MNO utility application) may communicate with backend slice access services 110 to activate slice entitlement 130. Backend slice access services 110 may update 132 the user's subscription profile in network 104 to enable application 108 on UE 102 to access the requested network slice. With network authorization in place, app 108 may send traffic over the premium network slice, as indicated at reference 134.

As shown at reference 136, app 108 (or the MNO utility application) may provide a user interface to pause or activate access to the premium network slice for app 108. Furthermore, network slice use may be selectively paused by the user or due to app 108 inactivity to conserve network resources. Thus, by using an in-app interface, a user may selectively conserve subscribed resources (e.g., data limits, time limits, etc., for the network slice subscription) for application 108.

Figure 2:
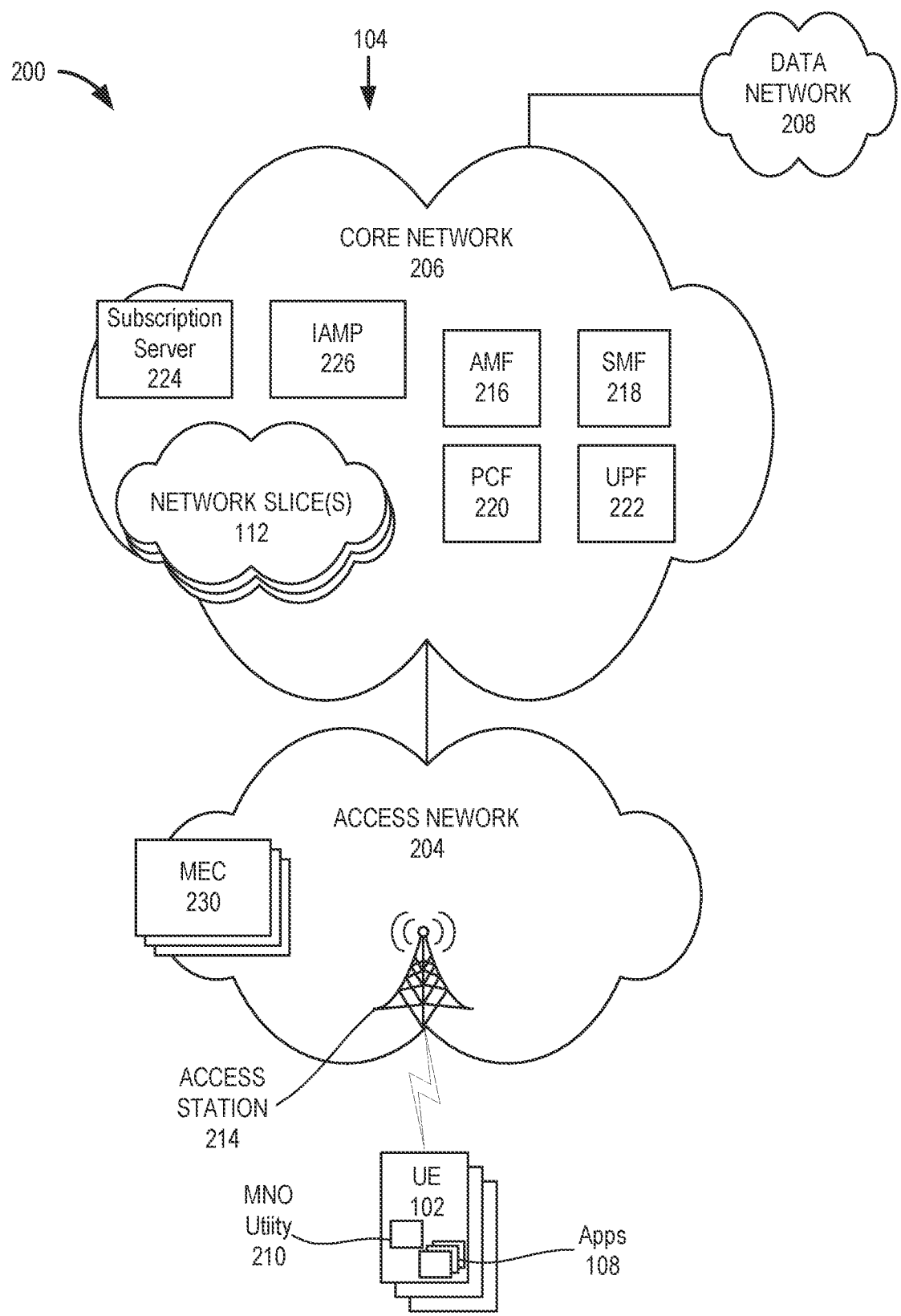
FIG. 2 is a diagram illustrating a network environment in which systems and methods described herein may be implemented.

FIG. 2 illustrates an example network environment 200 in which the systems and methods described herein may be implemented. As shown, environment 200 may include one or more UE devices 102 (generically and individually referred to as "UE 102"), network 104, and a data network 208. Network 104 may include an access network 204 and a core network 206.

UE 102 may include a wireless communication device, a mobile terminal, or a fixed wireless access (FWA) device. Examples of UE 102 include a smart phone; a tablet device; a wearable computer device (e.g., a smart watch); a laptop computer; an autonomous vehicle with communication capabilities; a portable gaming system; and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204.

One or more applications 108 on UE 102 may be configured for optimal performance using a preferred network slice, which an MNO of network 104 may offer as a service with an addition subscription. In some implementations, UE 102 may also include a MNO utility application 210. As described further herein, MNO utility application 210 may provide an interface with network 104 to enable dynamic in-app subscriptions and pausing for network slices.

Access network 204 may allow UE 102 to connect to core network 206, data network 208, and other devices associated with or included in network 104 (e.g., another UE 102). To do so, access network 204 may establish and maintain, with participation from UE 102, an over-the-air channel with UE 102; and maintain backhaul channels with core network 206. Access network 204 may convey information through these channels, from UE 102 to core network 206 and vice versa. Access network 204 may include a 5G radio network (e.g., a 5G New Radio (NR) network), a 4G radio network (e.g., an evolved Universal Mobile Telecommunications Service (UMTS) Terrestrial Network (eUTRAN)), and/or another advanced radio network. These radio networks may operate in many different frequency ranges, including millimeter wave (mmWave) frequencies, sub 6 GHz frequencies, and/or other frequencies. Access network 204 may include multiple access stations, one of which is shown as access station 214.

Access station 214 may include a 5G, 4G, or another type of access station (e.g., a wireless station, a base station, an evolved Node B (eNB), a next generation Node B (gNB), a Central Unit (CU), a Distributed Unit (DU), a Radio Units (RU), etc.). Some access stations 214 may include Radio Frequency (RF) transceivers for wireless or cellular communication. In some implementations, access station 214 may include Integrated Access and Backhaul (IAB) nodes (not shown). Access station 214 may establish and maintain an over-the-air channel with UE 102 and backhaul channels with core network 206.

Access network 204 may include one or more Multi-Access Edge Computing (MEC) clusters 230. MEC cluster 230 may be located geographically close to access stations and, therefore, also be close to UEs 102 serviced by the access station 214. Due to its proximity to UEs 102, MEC cluster 230 may be capable of providing services to UEs 102 with minimal latency. Thus, MEC functions may be included in one of more of network slices 112. Depending on the implementations, a MEC cluster 230 may provide many core network functions at network edges. In other implementations, a MEC cluster 230 may be positioned at other locations (e.g., in core network 206) at which the MEC cluster 230 can provide computational resources for improved performance.

Core network 206 may include 5G core network components, a combination of 4G and 5G core network components, or another type of core network components.

Examples of 5G core network components include a User Plane Function (UPF), an Application Function (AF), an AMF, a Session Management Function (SMF), a Unified Data Management (UDM) function, a Network Slice Selection Function (NSSF), and a Policy Control Function (PCF). Examples of 4G core network components include a Serving Gateway (SGW), a Packet data network Gateway (PGW), and a Mobility Management Entity (MME). Core network 206 may allow the delivery of Internet Protocol (IP) services to UE 102, and may interface with other networks, such as data network 208.

In FIG. 2, core network 206 is shown as including network slices 112, an AMF 216, an SMF 218, a PCF 220, a UPF 222, a subscription server 224, and an Identity and Authentication Management Platform (IAMP) 226. In different embodiments, however, some of these components also may be implemented on access network 204 and/or MEC cluster 230. Access network 204, core network 206, and MEC cluster 230 may include multiple instances of network slices 112, AMF 216, SMF 218, PCF 220, UPF 222, subscription server 224, IAMP 226, and/or other core network components.

In some implementations, core network 206 may provide to UE 102 an indication of whether a customer has an existing subscription for a network slice (e.g., a network slice 112 to support premium services for application 108). For example, when URSP rules are not available, devices in core network 206 may transmit slice subscription information (e.g., via access station 214) in the form of a PCO message or an extended PCO (ePCO) message for an operating system. UE 102 may determine that a particular field of the PCO or ePCO message includes a user's subscription status for a network slice. The particular field may include an existing PCO/ePCO container or a PCO/ePCO container dedicated to include information indicating a user's slice subscription status. The PCO/ePCO message may be generated by a network device in core network 206 either periodically or in response to the network device determining that a subscription for a preferred network slice is requested. For example, the PCO/ePCO message may be sent to UE 102, via access network 204, by an Access and Mobility Management Function (AMF) that is associated with a User Plane Function (UPF) that routes traffic associated with an application session.

Network slices 112 may be instantiated as a result of network slicing. According to an implementation, one or more network slices 112 may be configured to provide premium services (e.g., low latency, QoS, etc.) for which a user subscription is required. Network slices 112 are associated with and may be identified by Network Slice Selection Assistance Information (NSSAI). A single network slice 112 may be identified by a Single-NSSAI (S-NSSAI).

AMF 216 may perform registration management, connection management, reachability management, mobility management, lawful intercepts, Short Message Service (SMS) transport between UE 102 and an SMS function, session management message transport between UE 102 and SMF 218, access authentication and authorization, location services management, support of non-3GPP access networks, and/or other types of management processes. AMF 216 may page UE 102 based on mobility category information associated with UE 102 obtained from a Unified Data Management (UDM) function.

SMF 218 may perform session establishment, modification and/or release; perform IP address allocation and management; perform Dynamic Host Configuration Protocol (DHCP) functions; perform selection and control of a UPF; configure traffic steering at a UPF to guide traffic to the correct destination; terminate interfaces toward PCF 220; perform lawful intercepts; charge data collection; support charging interfaces; control and coordinate charging data collection; terminate session management parts of Non-Access Stratum (NAS) messages; perform downlink data notification; manage roaming functionality; and/or perform other types of control plane processes for managing user plane data.

PCF 220 may support policies to control network behavior, provide policy rules to control plane functions (e.g., to an SMF 218), access subscription information relevant to policy decisions, perform policy decisions, and/or perform other types of processes associated with policy enforcement. According to an implementation described herein, PCF 220 may forward URSP updates toward UEs 102 to reflect results of a dynamic in-app network slice subscription. In another implementation, PCF 220 may instruct AMF 216 and/or UPF 222 to send operator defined PCO messages to reflect results of a dynamic in-app network slice subscription.

UPF 222 may maintain an external Packet Data Unit (PDU) point of interconnect to a particular data network (e.g., data network 208), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB/access station 214), and/or perform other types of user plane processes.

Subscription server 224 and IAMP 226 may be part of backend slice access services 110. Subscription server 224 may include one or more network devices to provide backend services for managing network slice subscriptions and permissions. According to an implementation, subscription server 224 may receive and manage requests for dynamic in-app subscriptions and for pausing network slice access. Subscription server 224 may include an access management function to approve dynamic in-app subscription requests (e.g., add-on requests to access a premium network slice) and/or pauses to network slice access. Subscription server 224 may also include a charging function to communicate to other core network functions (e.g., in IAMP 226) new in-app subscriptions, pauses, and/or starts for network slice access.

IAMP 226 may authenticate the identity of users and store information which identifies actions that users/subscribers are authorized to perform. IAMP 226 may include server backend components, such as a subscriber profile controller (SPC), a mobile terminating access service (MTAS), a billing and charging function, etc. The components may issue access tokens, also referred to as authorization tokens, upon successful verification of user identities. The authorization framework may use an authorization layer such as OAuth 2.0 for credentials grant. The access tokens may be based on Java Script Object Notation (JSON) web tokens (JWTs) secured using digital signatures or Message Authentication Codes based on JSON Web Signature (JWS). IAMP 226 may access user profile information from, for example, subscription server 224 and/or a provisioning platform.

Data network 208 may include networks that are external to core network 206. In some implementations, data network 208 may include packet data networks, such as an Internet Protocol (IP) network or another type of network. For example, data network 208 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks.

For simplicity, FIG. 2 does not show all components that may be included in network 104 (e.g., routers, bridges, wireless access point, additional networks, access stations 214, MEC clusters, etc.). Depending on the implementation, network 104 may include additional, fewer, different, or a different arrangement of components than those illustrated in FIG. 2. Furthermore, in different implementations, the configuration of network 104 may be different.

Figure 3:
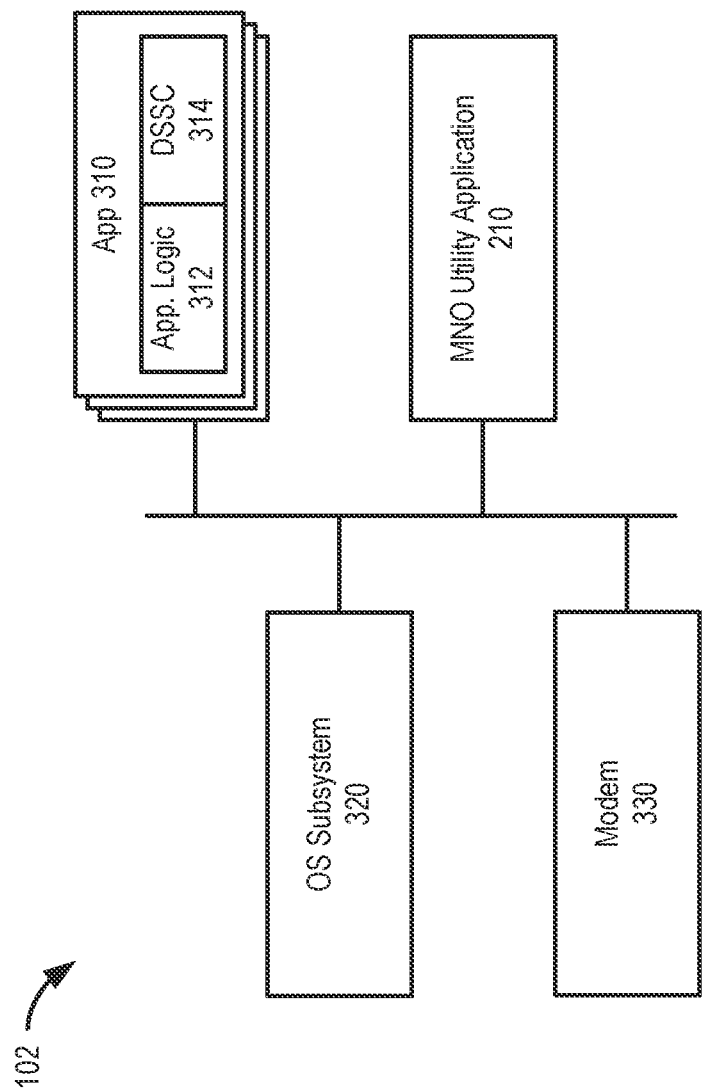
FIG. 3 is a diagram of example logical components implemented in a user equipment (UE) device, according to an implementation.

FIG. 3 illustrates logical components of UE 102 according to an implementation. As shown in FIG. 3, UE 102 may include client applications 310, MNO utility application 210, an operating system (OS) subsystem 320, and a modem 330. In an implementation, all or some of the components illustrated in FIG. 3 may be implemented by a processor (e.g., processor 920 of FIG. 9) executing software instructions stored in a memory (e.g., memory 930 of FIG. 9). In other implementations, some or all of the components illustrated in FIG. 3 may be implemented in hardware or a combination of hardware, firmware and software used to perform the functionality described below.

Client applications 310 may include applications (e.g., software) running on UE 102. Client applications 310 may correspond to one of application 108. For example, a client application 310 may include a video streaming application, a web browser, a gaming application, etc. Some client applications 310 may require relatively high uplink and/or downlink throughput/bandwidth for an optimal user experience. Such client applications 310 make use of network slicing, and, more particularly, a network slice 112 providing premium services. Other client applications 310 may not have requirements for any particular network slice and may generate data processed as default Internet traffic. Client application 310 may include application logic 312 and a slicing subscription client (DSSC) 314.

According to an embodiment, application logic 312 may include logic that provides a service pertaining to a software application. For example, application logic 312 may provide a gaming service, betting service, streaming service, shopping service, social media service, etc., for a user of UE 102. Application logic 312 may request (e.g., based on configuration settings or an application server request) a network slice 112 providing premium services.

Dynamic slicing subscription client 314 may manage communications to support dynamic in-app subscriptions to network slices. For example, in one implementation dynamic slicing subscription client 314 may include a client-side service to identify if a user subscription does not include a preferred network slice (e.g., a network slice 112 providing premium services) for application logic 312. In one implementation, if there is no subscription for the preferred network slice, dynamic slicing subscription client 314 may prompt the user to ask if the user wants to subscribe to a premium network slice. For example, dynamic slicing subscription client 314 may provide a pop-up window that asks if the user wants to upgrade to a premium service network slice (e.g., a "performance boost" service). In one embodiment, dynamic slicing subscription client 314 may be implemented through a Software Development Kit (SDK) that the MNO provides to the application developer. For example, the SDK may include software code and/or application program interfaces (APIs) to integrate dynamic slice subscription capabilities into client application 310.

According to one embodiment, dynamic slicing subscription client 314 may interact with operator's entitlement server (e.g., in backend slice access services 110) to present purchase options to the user and forward user selections to the server. In another embodiment, at least some features of dynamic network slicing client 314 may be implemented with MNO utility application 210. For example, dynamic network slicing client 314 may use an API to have MNO utility application 210 prompt the user and manage a dynamic network slice subscription process. If in-app network slice subscription is successful, client application 312 may be provided with an access token for the network slice.

MNO utility application 210 may serve as an intervening utility application to provide MNO-based services for applications 310. MNO utility application 210 may include software or a combination of software and firmware to supplement MNO-specific functions of UE 102. According to an implementation, MNO utility application 210 may provide an interface between application 310 and network 104. Applications 310 may use API calls to MNO utility application 210 to obtain subscription status information (e.g., whether or not a user's subscription includes access to a premium network slice), prompt a user to subscribe to a network slice, or pause/resume use of a network slice subscription.

OS subsystem 320 may establish a connection (e.g., an IP connection) between client application 310 and modem 330. In implementations described herein, OS subsystem 320 may communicate traffic descriptor values from application logic 312 to modem 330. For example, OS subsystem 320 may be configured to receive an access token from client application 310 (via application logic 312) for the new network slice and provide the token value to modem 330. In some implementations, OS subsystem 320 may also provide a governance function to confirm that client application 310 is authorized to use the new traffic descriptor value. According to an implementation described herein, OS subsystem 320 may receive PCO messages from core network 206 to update and application's network slice access based on dynamic in-app subscriptions initiated by dynamic network slicing client 314 and/or MNO utility application 210.

Modem 330 may manage the physical layer and connectivity for UE 102. Modem 330 may include, for example, a 5G/NR modem that performs processing, modulation, demodulation, and/or other signal processing for 5G/NR communications of UE 120. Modem 330 may store URSP rules and/or access the URSP rules from a SIM, a SIM-like device, or another secure element (not shown) of UE 102. According to implementations described herein, modem 330 may receive updated URSP rules from core network 206 in response to a dynamic in-app subscriptions to a network slice.

Although FIG. 3 shows exemplary logical components of UE 102, in other implementations, UE 102 may include fewer components, different components, differently arranged components, or additional components than depicted in FIG. 3. In addition, functions described as being performed by one of the logical components in FIG. 3 may alternatively be performed by another one or more of the components of UE 102.

Figure 4:
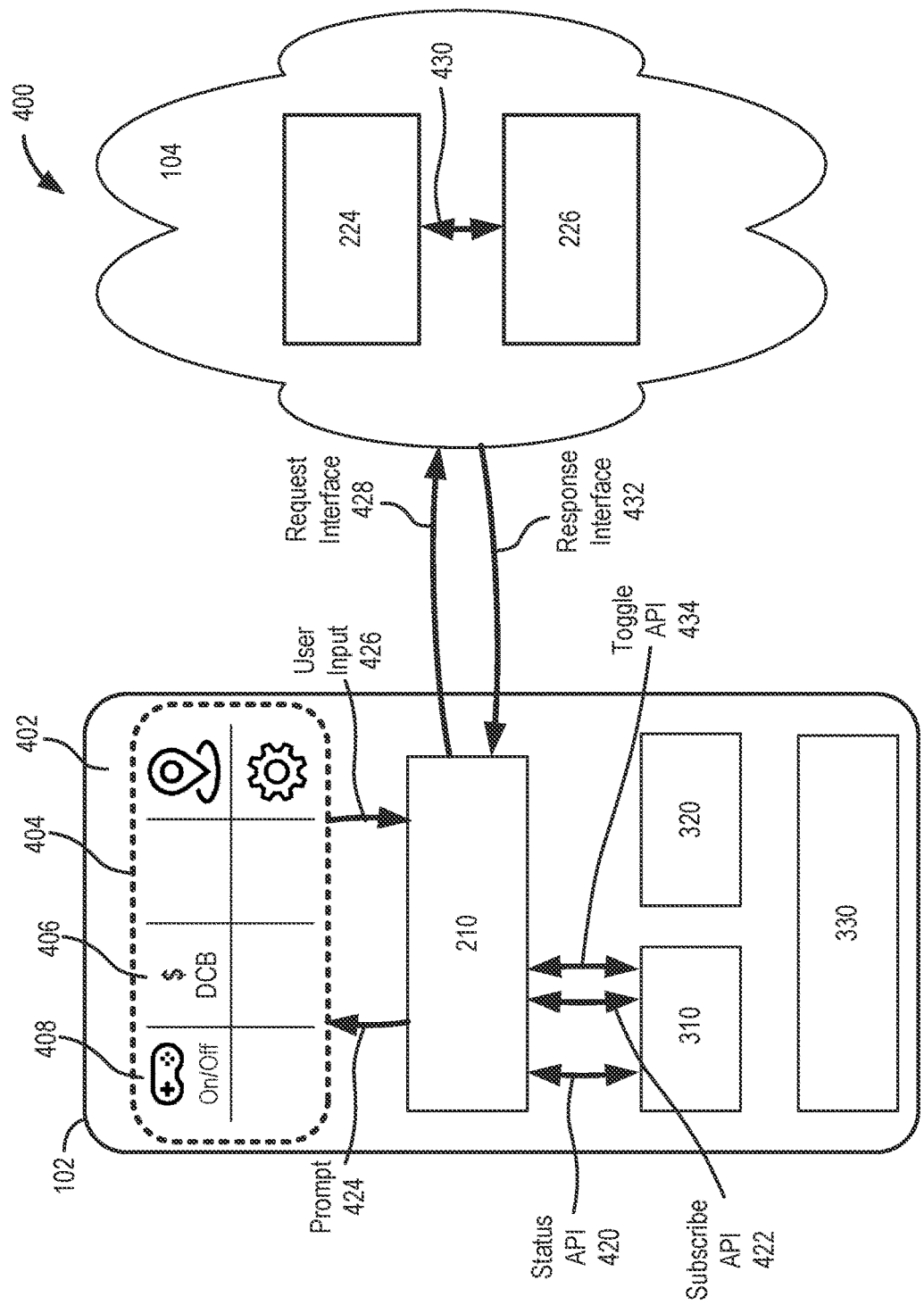
FIG. 4 is a diagram illustrating communications for providing dynamic in-app subscriptions and controls for network slices.

FIG. 4 illustrates example communications for providing dynamic in-app subscriptions and controls for network slices in a portion 400 of network environment 100, according to an implementation. Network portion 400 may include UE 102, subscription server 224, and IAMP 226. UE 102 may include a display screen 402 upon which a menu 404 (e.g., a pop-up menu or another type of user interface) may be displayed. UE 102 may also include components such as application 310, OS subsystem 320, MNO utility application 210, and modem 330.

As shown in FIG. 4, application 310 (e.g., DSSC 314) may use a status API 420 to request a slice subscription status request during, for example, an application launch procedure. The status request may indicate a preferred network slice (e.g., a slice class identifier, QoS requirements, etc.) for application 310. MNO utility application 210 may respond to the status request (using status API 420) with subscription information indicating whether or not the user has a current subscription to the requested slice.

Assuming the user does not have a current subscription to the requested network slice, client application 310 (e.g., DSSC 314) may use a subscribe API 422 to prompt the user to subscribe to the requested network slice. MNO utility application 210 may respond to the subscription request (using subscribe API 420) by generating menu 404 to prompt 424 the user to provide user input to approve (or deny) the requested premium network slice subscription. For example, a user may select a direct carrier billing (DCB) icon 406 to initiate a subscription transaction. The user selection may be detect by MNO utility application 210 as user input 426.

In response to user input 426, and assuming a user approves a subscription, MNO utility application 210 may communicate with network 104 over request interface 428 to obtain subscription options and set up a new premium network slice subscription. IAMP 226 and subscription server 224 may exchange information over interface 430 to update a user profile with the new premium network slice subscription. For example, MNO utility application 210 may retrieve subscription plan options for presentation to the user and confirm entitlement with IAMP 226. Upon a successful subscription upgrade, IAMP 226 may provide to MNO utility application 210 and/or OS subsystem 320 access authorization (e.g., an access token for the network slice) via response interface 432. In one implementation, MNO utility application 210 may receive the access token and forward the access token to client application 310 via subscribe interface 422.

Assuming that a subscription for the premium network slice has been established for application 310, at some later point in time it may be beneficial for the user to control when client application 310 uses the premium network slice. Accordingly, client application 310 may use toggle API 434 to cause MNO utility application 210 to activate a start/pause icon 408 (e.g., in menu 404 or as a separate pop-up menu). In one implementation, client application 310 may request presentation of icon 408 at launch. In another implementation, client application 310 may request presentation of icon 408 when the application is using the premium network slice and application activities (e.g., game conditions) do not require a premium network slice QoS. In another implementation, client application may request presentation of icon 408 when access to the network slice has been paused by the user and the application is unable to provide optimal performance.

Similar to the discussion above, MNO utility application 210 may receive the request via toggle API 434, and use user interfaces 424 and 426 to present icon 408 and obtain user input. Based on the user input to either activate or pause access to the premium network slice by client application 310, MNO utility application 210 may use request interface 428 to signal the provider network of the user input. Subscription server 224 and IAMP 226 may confirm entitlement for the change, update the user profile, and provide to MNO utility application 210 the updated access status (e.g., access to the network slice is paused or active). MNO utility application 210 may receive the access status and forward the access status to client application 310 via toggle interface 422.

FIG. 4 illustrates examples of communications for an embodiment of network portion 400. In other embodiments, additional, fewer, or different communications may be used. For example, in another embodiment, MNO utility application 210 may be eliminated. In such an embodiment, functions of MNO utility application 210 described above may be incorporated into client application 310 using MNO-supplied SDKs, for example. Client application 310 may, thus, present menu 404, obtain user input, and communicate with devices in provider network 104 to implement dynamic in-app subscriptions and slice controls.

Figure 5:
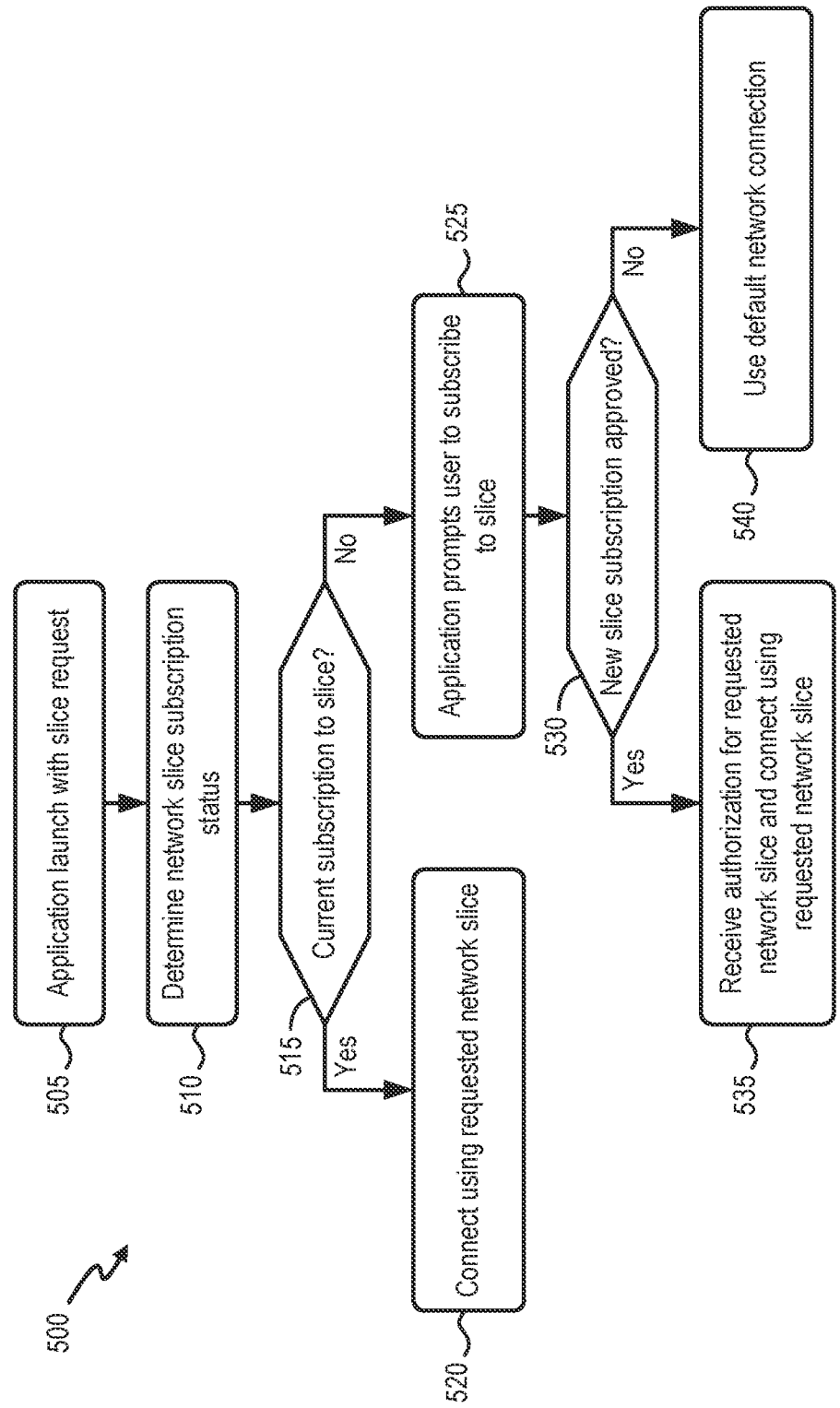
FIGS. 5 and 6 are flow diagrams illustrating an exemplary process for providing dynamic in-app network slice access, according to an implementation.

FIG. 5 is a flow diagram illustrating an exemplary process 500 for providing dynamic in-app network slice access, according to implementations described herein. In one implementation, process 500 may be implemented by UE 102 executing client application 310 and MNO utility application 210. In another implementation, process 500 may be implemented by UE 102 in conjunction with one or more other devices in network environment 100, such as subscription server 224 and/or IAMP 226.

Process 500 may include application 310 providing a slice request during a launch (block 505) and determining a subscription status for the requested network slice (block 510). For example, application 310 may be configured for optimal performance with a particular network slice, which may be indicated by a slice class identifier or QoS indication that corresponds to a preferred network slice. As part of a launch process, application 310 may indicate slicing needs (e.g., via a Net_Capability_LL API call, or similar call). Application 310 (e.g., DSSC 314) may determine if a user has a subscription for a network slice, such as a preferred network slice for which the application 310 is configured. Options for determining if a subscription for a network slice is available to client application 310 is shown in FIG. 6.

Figure 6:
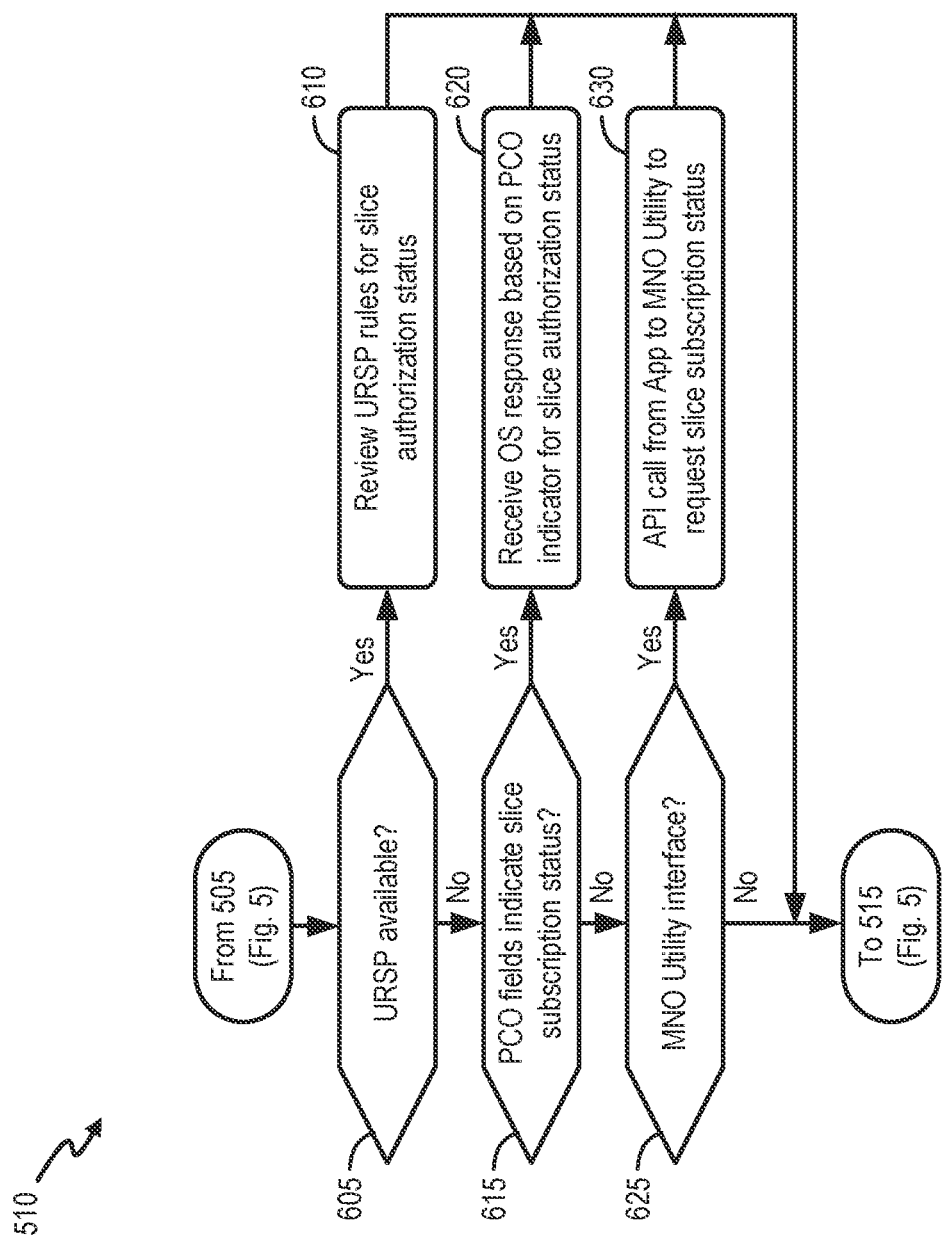

Referring to FIG. 6, application 310 may determine if URSP information is available (block 605). For example, according to one implementation, application 310 may obtain a copy of a URSP rule that indicates available slices (or slicing classes) to which a user has a subscription. For example, as part of an application launch sequence, application 310 may receive URSP rule indicating the slices to which a subscriber is authorized. If URSP information is available (block 605—Yes), application client 310 may review the URSP rules for slice authorization status (block 610).

If URSP information is not available (block 605—No), application client 310 may determine if PCO fields indicate a slice subscription status (block 615). For example, modem 330 and/or OS subsystem 320 may receive slice subscription information from network 104 via PCO fields (e.g., MNO-defined PCOs). For example, prior to launch of application 310, a PCF (e.g., PCF 220) may transmit in a PCO message or ePCO message with slice subscription information to application 310. Application client 310 may query OS subsystem 320 for a premium slice (e.g., via a Net_Capability_LL API call or a similar call) and OS subsystem 320 may respond based on information in the PCO/ePCO message. If PCO fields indicate a slice subscription status (block 615—Yes), application client 310 may receive a response from OS subsystem 320 based on the information in the PCO/ePCO message (block 620).

If PCO fields do not indicate a slice subscription status (block 615—No), application client 310 may determine if an MNO utility interface is available (block 625). For example, in still another implementation, client application 310 may be configured to interface with MNO utility application 210 to obtain slice subscription information. If an MNO utility interface is available (block 625—Yes), application client 310 may submit an API call to MNO utility application to request slice subscription status (block 630). For example, application 310 may obtain from MNO utility application 210 (e.g., via an API call using status API 420) information about what slice(s) a user has subscribed to. If an MNO utility interface is not available (block 625—No), or after any of blocks 610, 620, or 630, application client 310 may proceed to block 515 of FIG. 5.

Referring to block 515 in FIG. 5, if there is a current subscription for the requested network slice (block 515—Yes), process 500 may include establishing a PDU session for the requested network slice (block 520). For example, if any of the options in process block 515 indicate that the user already has a current subscription for the application to use the preferred network slice, client application 310 may proceed to launch with a request to OS subsystem 320 for the preferred network slice.

If there is no current subscription for the requested network slice (block 515—No), process 500 may include prompting the user to subscribe to the requested network slice (block 525). For example, upon determining that a user does not have a subscription for a preferred network slice, application 310 may prompt the user via MNO utility application 210 to obtain a subscription through a user interface supplied by MNO utility application 210. Client application 310 (e.g., DSSA 314) may provide an API call (e.g., via subscribe API 422) to MNO utility application 210 to initiate a user prompt. Alternatively, in an implementation where some functions of MNO utility application 210 are integrated into client application 310, application 310 may interact with an entitlement server (e.g., on IAMP 226) to present network slice subscription/purchase options to the user.

Process 500 may further include determining if the new slice subscription is approved (block 530). For example, client application 310 may detect if the user input provides an affirmative response to get a slice subscription and if the provider network authorizes the subscription.

If a new slice subscription is approved (block 530—Yes), process 500 may include receiving authorization for the requested network slice and establishing a PDU session with the requested network slice (block 535). For example, upon a successful subscription upgrade, IAMP 226 may provide to application 310 and/or OS 320 access authorization (e.g., an access token, updated URSP rules, a PCO message, etc.) for the preferred network slice. Once notified, client application 310 may proceed to launch with a request to OS subsystem 320 for the preferred network slice.

If a new slice subscription is not approved (block 535—No), process 500 may include using a default network connection (block 540). For example, if the user input rejects the option to subscribe, or if the network denies the subscription request, client application 310 may proceed to initiate a PDU session using a default network connection for internet traffic.

Figure 7:
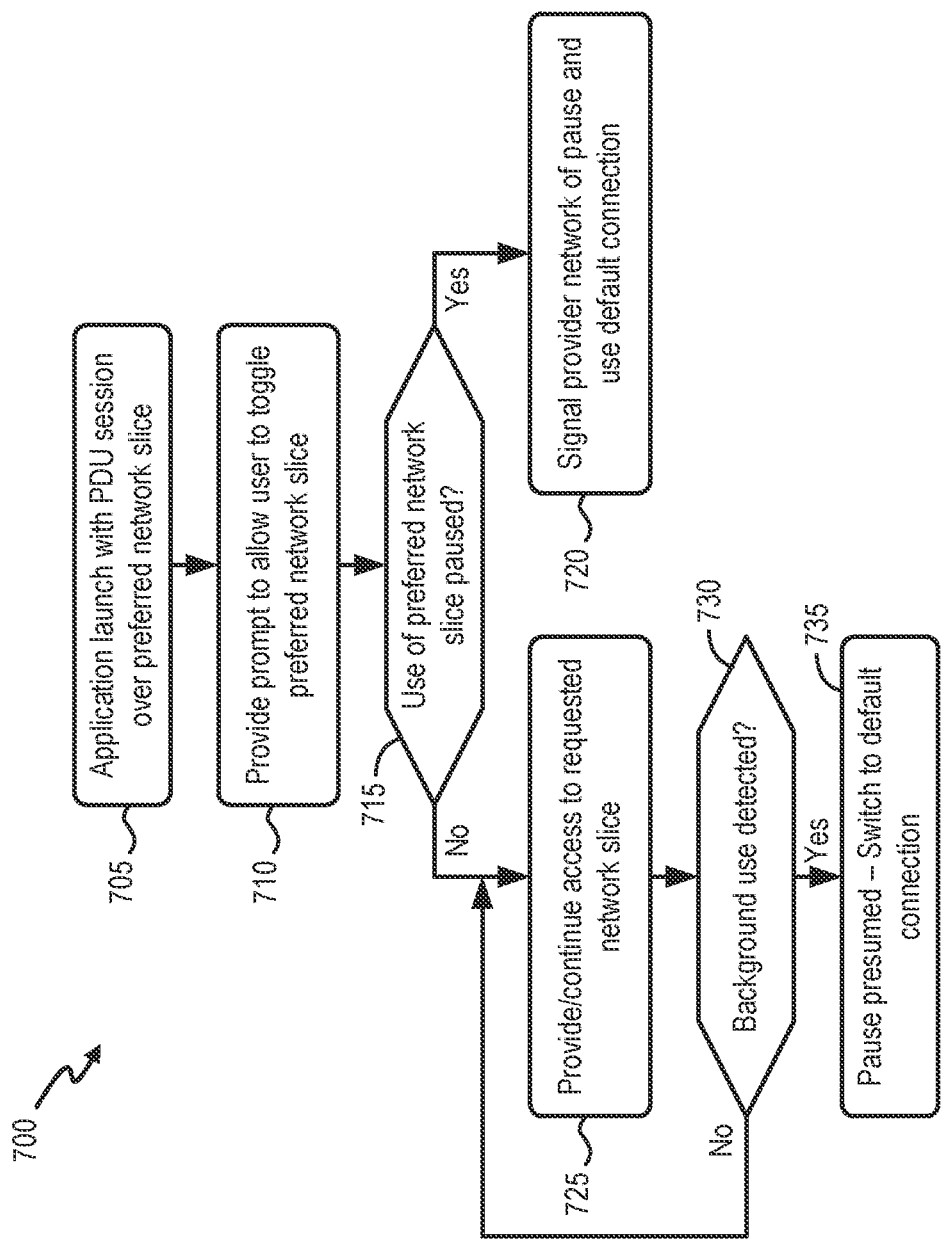
FIGS. 7 and 8 are flow diagrams illustrating an exemplary process for providing dynamic in-app network slice controls, according to an implementation.

FIG. 7 is a flow diagram illustrating an exemplary process 700 for providing dynamic in-app network slice controls, according to implementations described herein. In one implementation, process 700 may be implemented by UE 102 executing client application 310 and MNO utility application 210. In another implementation, process 700 may be implemented by UE 102 in conjunction with one or more other devices in network environment 100, such as subscription server 224 and/or IAMP 226.

Process 700 may include application 310 launching and establishing a PDU session over a preferred network slice (block 705). For example, as part of a launch process, application 310 may indicate slicing needs and, assuming there is a user subscription to support the application's request, OS subsystem 320 and modem 330 may establish a connection over the preferred network slice.

Process 700 may further include providing a user prompt to allow the user to toggle use of the preferred network slice (block 710). For example, as shown in FIG. 4, client application 310 may cause a start/pause icon 408 to be presented to a user. Options to prompt a user are described in connection with FIG. 8.

Figure 8:
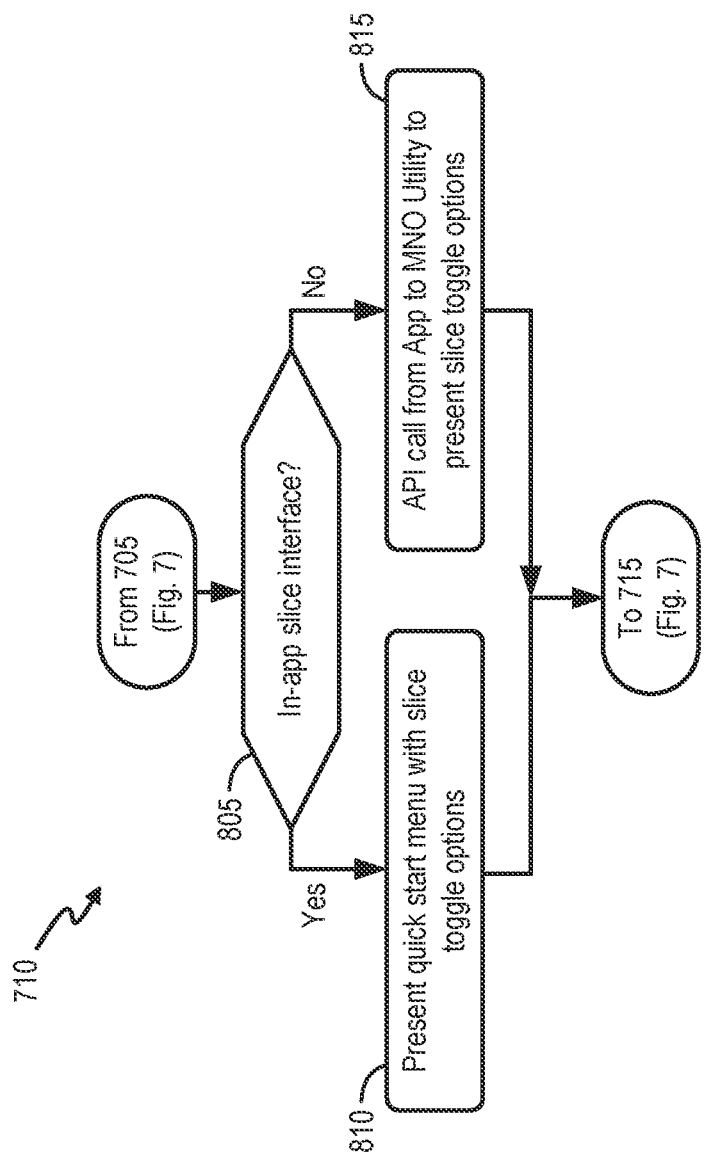

Referring to FIG. 8, client application 310 may provide an in-app slice interface (block 805). For example, using an OMN-provided SDK, application developers for client application 310 may provide a user interface to solicit user toggle controls (e.g., start/pause) for an application's preferred network slice. If an in-app slice interface is available (block 805—Yes), application 310 may present to the user a quick start menu with slice toggle options (block 810). For example, client application 310 may present a menu including start/pause icon 408 or a similar indicator to solicit user input regarding whether the application should use the available preferred network slice for the current session.

If an in-app slice interface is not available (block 805—No), application 310 may provide an API call to an MNO utility application to present slice toggle options to the user (block 815). For example, client application 310 may request MNO utility application 210 (e.g., via an API call using toggle API 434) to present menu 404 and/or icon 408. After presentation of either slice toggle option, application client 310 may proceed to block 715 of FIG. 7.

Referring to block 715 of FIG. 7, if user input to either of the slice toggle options indicates a pause of the preferred network slice (block 715—Yes), client application 310 may signal the provider network of the pause and use a default network connection (block 720). For example, if the user input pauses the preferred network slice (e.g., to preserve subscription time/data for future use), client application 310 or MNO utility application 210 may inform network 104 of the user pause. For example, client application 310 or MNO utility application 210 may send to subscription server 224 a signal to disable access to the preferred network slice by the application. Client application 310 may proceed to initiate a PDU session using a default network connection for internet traffic. Network 104 (e.g., subscription server 224 and/or IAMP 226) may update a user profile and charging, if necessary.

If user input to either of the slice toggle options does not indicates a pause of the preferred network slice (block 715—No), client application 310 may establish a PDU session with the requested network slice (block 725). For example, client application 310 may proceed to launch with a request to OS subsystem 320 for the preferred network slice.

If client application 310 detects background use of the application (block 730—yes), client application 310 may presume a pause and switch to a default connection (block 735). For example, if application 310 determines that other application windows are active over the display of application 310 (e.g., client application 310 is running in the background), client application 310 or MNO utility application 210 may inform network 104 of the user pause and may proceed to initiate a PDU session using a default network connection for internet traffic. Network 104 (e.g., subscription server 224 and/or IAMP 226) may update a user profile and charging to reflect a pause, if necessary.

Figure 9:
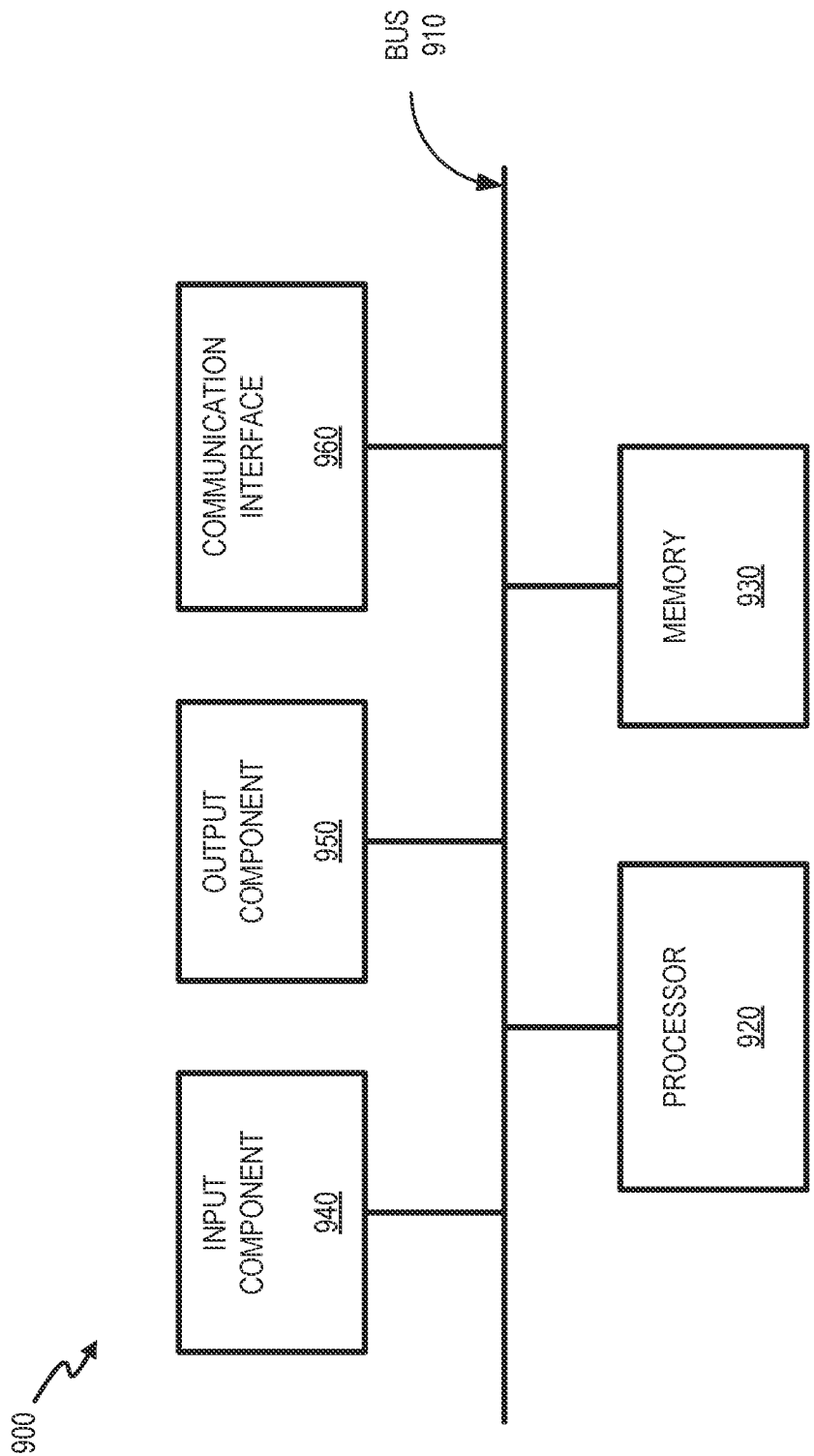
FIG. 9 is a diagram illustrating example components of a device that may correspond to one or more of the devices illustrated and described herein.

FIG. 9 illustrates example components of a device 900 according to an implementation described herein. Components of UE 102, access station 214, AMF 216, SMF 218, PCF 220, UPF 222, Subscription server 224, IAMP 226, and other network devices in network 104 may each include or be implemented on one or more devices 900. Device 900 may include a bus 910, a processor 920, a memory 930, an input component 940, an output component 950, and a communication interface 960.

Bus 910 may include a path that permits communication among the components of device 900. Processor 920 may include a processor, a microprocessor, or processing logic that may interpret and execute instructions. Memory 930 may include any type of dynamic storage device that may store information and instructions, for execution by processor 920, and/or any type of non-volatile storage device that may store information for use by processor 920. Input component 940 may include a mechanism that permits a user to input information to device 900, such as a keyboard, a keypad, a button, a switch, etc. Output component 950 may include a mechanism that outputs information to the user, such as a display, a speaker, one or more light emitting diodes (LEDs), etc. For example, in the context of UE 102, output component 950 may include an icon display to selectively present menu icons (e.g., icons 406 and 408), as described herein.

Communication interface 960 may include a transceiver that enables device 900 to communicate with other devices and/or systems via wireless communications, wired communications, or a combination of wireless and wired communications. For example, communication interface 960 may include mechanisms for communicating with another device or system via a network. Communication interface 960 may include an antenna assembly for transmission and/or reception of RF signals. For example, communication interface 960 may include one or more antennas to transmit and/or receive RF signals over the air. In one implementation, for example, communication interface 960 may communicate with a network and/or devices connected to a network. Alternatively, or additionally, communication interface 960 may be a logical component that includes input and output ports, input and output systems, and/or other input and output components that facilitate the transmission of data to other devices.

Device 900 may perform certain operations in response to processor 920 executing software instructions contained in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions contained in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

Although FIG. 9 shows exemplary components of device 900, in other implementations, device 900 may contain fewer components, additional components, different components, or differently arranged components than those depicted in FIG. 9. For example, device 900 may include one or more switch fabrics instead of, or in addition to, bus 910. Additionally, or alternatively, one or more components of device 900 may perform one or more tasks described as being performed by one or more other components of device 900.

Figure 10:
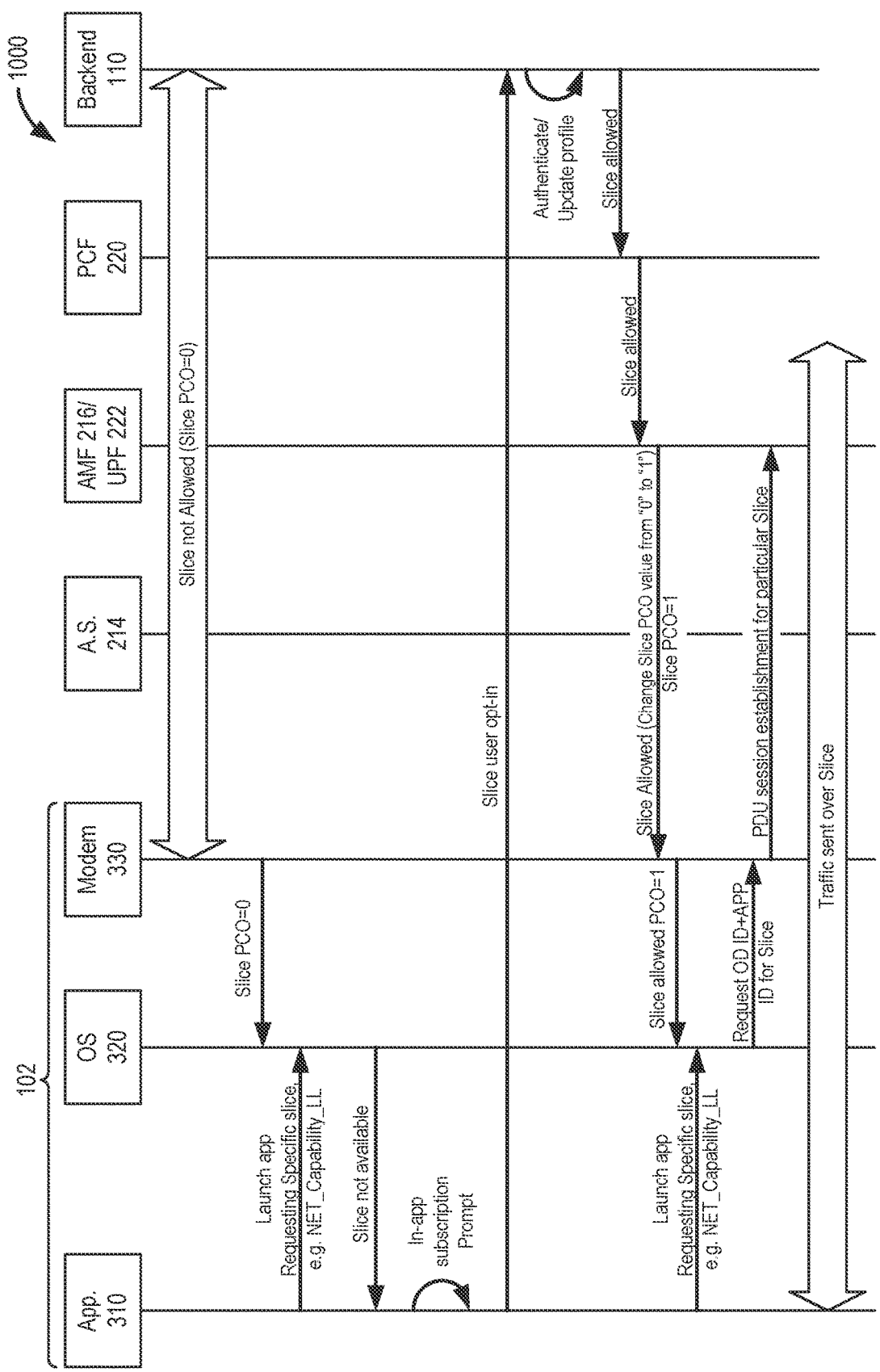
FIG. 10 is a diagram illustrating a use case for managing dynamic in-app slicing subscription requests.

FIG. 10 is a diagram illustrating a use case for managing dynamic in-app slicing subscription requests. More particularly, FIG. 10 illustrates use of PCO containers for network slice discovery. As shown in FIG. 10, network portion 1000 includes UE 102, access station 204, AMF 216/UPF 222, PCF 220, and backend slice access services 110. FIG. 10 provides a simplified illustration of communications in network portion 1000 and is not intended to reflect every signal, communication, or intermediate points for exchanges between functions/devices.

As shown in FIG. 10, subscription server 224 may send operator-defined PCO message(s) to UE 102 (e.g., modem 330) signaling that a user does not have a subscription for a particular network slice (e.g., "Slice PCO=0"). OS subsystem 320 may store the slice status. At a later time, client application 310 may be launched and request a specific network slice from OS subsystem 320 (e.g., using Net_capability_LL API). Based on the stored slice status, OS subsystem 320 may inform client application 310 that the requested slice is not available.

In response the indication that the requested slice is not available, client application 310 may initiate a dynamic in-app subscription prompt, such as described in connection with FIGS. 4-6. Although shown in FIG. 10 as being performed by client application 310, in other implementations the dynamic in-app subscription process may be performed using MNO utility application 210. Assuming a user of UE 102 elects to upgrade a subscription to include the requested network slice for client application 310, client application 310 may send a signal to backend slice access services 110 (e.g., subscription server 224). Backend slice access services 110 may manage approvals and profile updates to upgrade the user's subscription. Assuming approval, subscription server 224 may relay an updated subscription status (e.g., "slice allowed") to UE 102. The slice allowed indication may change the slice PCO value, from "0" to "1," for example, for the requested network slice. OS subsystem 320 may store the updated slice status.

Based on the complete dynamic in-app subscription process, client application 310 may again launch and request the specific network slice from OS subsystem 320 (e.g., using Net_capability_LL API). Based on the updated slice status, OS subsystem 320 may provide to modem 330 the endpoint ID and App ID (for client application 310) for use with the slice. Modem 330 may then communicate with AMF 216/UPF 222 for PDU session establishment. Once the session is established, client application 310 may send traffic over the network slice.

Systems and methods described herein may enable dynamic in-app subscriptions and controls for network slices. A user device may receive a command to launch an application and may identify a preferred network slice for the application. The application may determine that a network services subscription for the user device does not include the preferred network slice and may obtain consent, from a user of the user device, to add the preferred network slice to the network services subscription. The user device receives, from a provider network, authorization for using the preferred network slice by the application and initiates a network session on the preferred network slice.

The foregoing description of implementations provides illustration and description, but is not intended to be exhaustive or to limit the invention to the precise form disclosed. Modifications and variations are possible in light of the above teachings or may be acquired from practice of the invention. Also, while a series of blocks have been described with regard to FIGS. 5-8, the order of the blocks and message/operation flows may be modified in other embodiments. Further, non-dependent blocks may be performed in parallel. In addition, while particular menu icons (e.g., icons 406 and 408) have been illustrated, it should be understood that other icons may be used to solicit input for premium or non-premium network services.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A user device comprising:
one or more processors configured to:
receive a command to launch an application;
identify a preferred network slice for the application;
determine, by the application, that a network services subscription for the user device does not include the preferred network slice;
obtain consent, from a user of the user device, to add the preferred network slice to the network services subscription;
receive, from a provider network, authorization for using the preferred network slice by the application;
initiate a network session on the preferred network slice; and
provide a user prompt to allow the user to toggle use of the preferred network slice by the application.

2. The user device of claim 1, wherein the processor is further configured to:
detect user input to pause use of the preferred network slice; and
send, to the provider network and based on the detecting, a signal to disable access to the preferred network slice by the application.

3. The user device of claim 2, wherein, when detecting user input to pause use of the preferred network slice, the one or more processors are further configured to:
initiate, by the application, presentation of the user prompt to start or pause use of the preferred network slice.

4. The user device of claim 1, wherein, when determining that the network services subscription does not include the preferred network slice, the one or more processors are further configured to:
provide a UE Route Selection Policy (URSP) rule to the application.

5. The user device of claim 1, wherein, when determining that the network services subscription does not include the preferred network slice, the one or more processors are further configured to:
receive, from the provider network, a Protocol Configurations Options (PCO) message that indicates a subscription status for the user device.

6. The user device of claim 1, wherein, when determining that the network services subscription does not include the preferred network slice, the one or more processors are further configured to:
provide an Application Programming Interface (API) call to a Mobile Network Operator (MNO) utility application to request a subscription status.

7. The user device of claim 1, wherein, when obtaining the consent from the user, the one or more processors are further configured to:
submit an Application Programming Interface (API) call to a Mobile Network Operator (MNO) utility application to present a user interface for the subscription request.

8. The user device of claim 1, wherein, when obtaining the consent from the user, the one or more processors are further configured to:
send a message to an entitlement server in the provider network to obtain a subscription option for the preferred network slice.

9. The user device of claim 1, wherein the user device includes a user device configured for one of a 5G standalone network or a 5G non-standalone network.

10. The user device of claim 1, wherein the one or more processors are further configured to:
detect that the application is running in a background; and
send, to the provider network and based on the detecting, a signal to disable access to the preferred network slice by the application.

11. A method comprising:
receiving, by a user device, a command to launch an application;
identifying, by the application, a preferred network slice for the application;
determining, by the application, that a network services subscription for the user device does not include the preferred network slice;
obtaining consent, from a user of the user device, to add the preferred network slice to the network services subscription;
receiving, by the user device and from a provider network, authorization for using the preferred network slice by the application;
initiating, by the application, a network session on the preferred network slice; and
providing a user prompt to allow the user to toggle use of the preferred network slice by the application.

12. The method of claim 11, further comprising:
detecting user input to pause use of the preferred network slice; and
sending, to the provider network and based on the detecting, a signal to disable access to the preferred network slice by the application.

13. The method of claim 12, wherein detecting user input to pause use of the preferred network slice further comprises:
initiating, by the application, presentation of the user prompt to start or pause use of the preferred network slice.

14. The method of claim 11, further comprising:
detecting that the application is running in a background; and
sending, to the provider network and based on the detecting, a signal to disable access to the preferred network slice by the application.

15. The method of claim 11, wherein determining that the network services subscription does not include the preferred network slice further comprises:
receiving, from the provider network, a Protocol Configurations Options (PCO) message that indicates a subscription status for the user device.

16. The method of claim 11, wherein determining that the network services subscription does not include the preferred network slice further comprises:
providing an Application Programming Interface (API) call to a Mobile Network Operator (MNO) utility application to request a subscription status.

17. The method of claim 11, wherein obtaining the consent from the user further comprises one of:
submitting, by the application, an Application Programming Interface (API) call to a Mobile Network Operator (MNO) utility application to present a user interface for the subscription request; or
sending, by the application, a message to an entitlement server in the provider network to obtain a subscription option for the preferred network slice.

18. A non-transitory computer-readable storage media storing instructions, which, when executed by one or more processors of a user device, cause the user device to:
receive a command to launch an application;
identify a preferred network slice for the application;
determine, by the application, that a network services subscription for the user device does not include the preferred network slice;
obtain consent, from a user of the user device, to add the preferred network slice to the network services subscription;
receive, from a provider network, authorization for using the preferred network slice by the application;
initiate a network session on the preferred network slice; and
provide a user prompt to allow the user to toggle use of the preferred network slice by the application.

19. The non-transitory computer-readable storage media of claim 18, further comprising instructions to cause the user device to:
provide the user prompt to solicit user input;
detect, from the user prompt, user input to pause use of the preferred network slice; and
send, to the provider network and based on the detecting, a signal to disable access to the preferred network slice by the application.

20. The non-transitory computer-readable storage media of claim 18, wherein the instructions to determine that the network services subscription does not include the preferred network slice further comprise instructions to cause the user device to:
receive, from the provider network, a Protocol Configurations Options (PCO) message that indicates a subscription status for the user device; or
provide an Application Programming Interface (API) call to a Mobile Network Operator (MNO) utility application to request a subscription status.

* * * * *